Sept. 20, 1949.  J. M. TRAVERSO  2,482,383
PRUNE PICKER
Filed Sept. 4, 1946
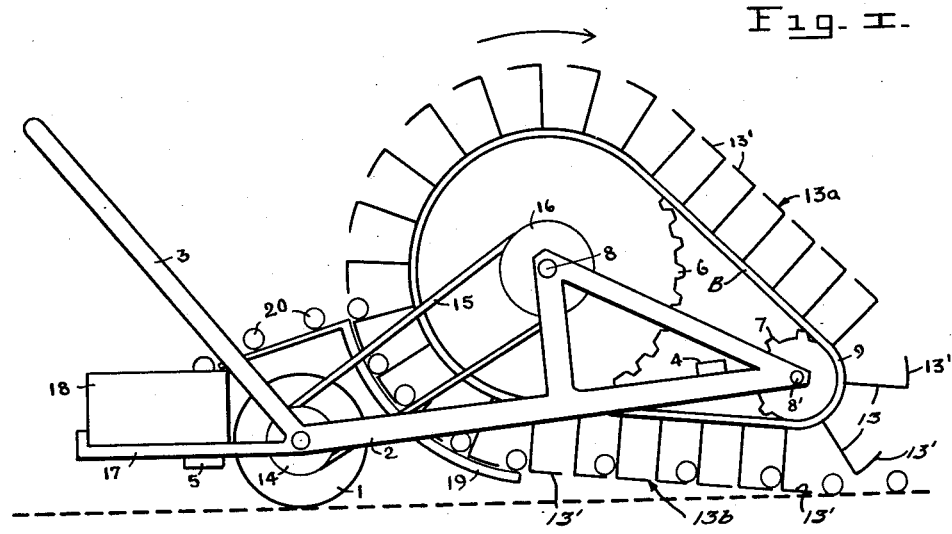
Fig. I.
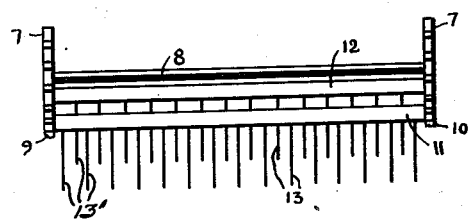
Fig. II.
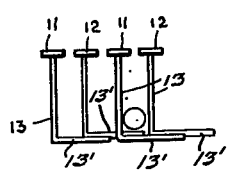
Fig. III.
INVENTOR
Joe M. Traverso Patented Sept. 20, 1949

2,482,383

UNITED STATES PATENT OFFICE 2,482,383

PRUNE PICKER

Joe M. Traverso, Madrone, Calif.

Application September 4, 1946, Serial No. 694,738

6 Claims. (Cl. 56—328)

My invention relates to improvements in fruit gatherers and the object of my improvement is to provide means for picking prunes, nuts, or other fruit from the ground and conveying them up into a receptacle. Prunes, nuts, and small apricots are usually shaken from the trees, or knocked off by means of poles and then picked up from the ground by hand. The main object of my invention is to provide a machine for this work and so reduce the labor and cost. Further objects are to provide screening means for separating the fruit from leaves, clods or stones, and means for holding and conveying the fruit gently without bruising. Other objects will appear from the following description.

In the accompanying drawings:

Fig. I is a side view of a prune picker embodying the present invention and showing but one lateral row of tines from the side.

Fig. II is a front fragmental view of the tines and belt.

Fig. III is an enlarged fragmentary side view of the bristles showing the arrangement thereof on alternate slats of the belt.

The roller 1 supports the frame 2, and the handle 3 affords means for guiding the machine and for governing the elevation of the forward end above ground. Crossbars 4 and 5 connect the similar opposite sides of the frame 2. The frame 2 supports upper sprockets 6 and lower sprockets 7, and their connecting shafts 8 and 8' respectfully. An endless belt, consisting of chains 9 and 10 and cross slats 11 and 12, passes over the two pairs of sprockets 6 and 7.

Each slat carries a plurality of flexible steel wire bristles, each bristle 13 being disposed in predetermined spaced relation lengthwise of a slat and each projecting outwardly from the slat and relative to the circuitous path of the same. The bristles 13 on the slats 11 are staggered relative to the bristles on alternate slats 12 in the manner as shown in Fig. II. In other words, one set of bristles lines up with that set of bristles on alternate slats but is off-set relative to the set of bristles on adjacent slats.

The slats follow each other in close succession and the bristles are bent at a right angle adjacent their tips or extremities to provide a foot portion 13' on each bristle extending backwardly relative to the direction of movement of the bristles, slats and chains. The foot portion 13' of each bristle extends beyond the set of bristles on the next adjacent slat so that when the bristles are in parallelism, the toe of each foot portion almost touches the heel of the foot portion on the following bristle in alignment therewith. Consequently, the several feet 13' of the collective bristles, when in parallelism, provide a closed grille 13a, the feet 13' being so spaced from each other as to form a mesh-work or screen having openings smaller in size than the size of the fruit to be picked up.

Pulley 14, attached to roller 1 and turning with it, drives V-belt 15, which in turn drives pulley 16 attached to sprocket 6. The pulleys and sprockets are preferably geared so that the bristles at their point of nearest contact with the ground move at about the same speed that the ground passes beneath them.

A bracket 17 at the rear of the machine supports the box 18 into which the fruit 20 is gathered. A sheet of metal 19 below the sprocket 6 guides the fruit up over the roller 1 into box 18.

In operation, the machine is moved forward by hand or by a power drive and the handle 3 lifted until the bristles coming around the smaller sprockets 7 almost touch the ground as they are about to assume parallel relation with preceding bristles in the lower reach of the belt B. It should here be noted that the bristles move in a forward direction over the upper reach of the belt, as indicated by the arrow in Fig. I; also, as the bristles travel in a straight line, they are parallel to each other, but in traveling around either sprocket, the bristles are separated, i. e., radially disposed to the axis of the respective sprocket.

Since the forward sprockets 7 are of relatively small diameter, it is apparent that the bristles will be disposed at a greater angularity with respect to each other when traveling around the forward sprockets. For this reason the feet 13' of the angularly disposed bristles are sufficiently spaced from each other to allow fruit to enter between them as the bristles, in effect walk around the small sprockets. Moreover, the bristles swing around the small sprockets at an accelerated speed and therefore close upon a preceding bristle with a snap-like action. In this manner, the fruit engaged by the closing bristles is brushed onto the extended feet of a preceding bristle substantially at the surface of the earth. The fruit thus captured is confined between the immediate preceding bristles and is supported upon the extended feet of the preceding aligned bristles.

As the chains travel from the periphery of the forward sprockets 7 toward the periphery of the rearward sprockets 6 they are inclined upwardly so as to effect an upwardly tending grille 13b to thereby lift the captured fruit from the surface of the earth. In this manner, any particles of dirt which may have been picked up with the fruit will drop through the grille or screen and nought but the fruit carried upwardly by the bristles.

As the bristles pass around the larger sprocket 6, they again separate, but not so widely as in passing round the smaller sprocket 7. They separate sufficiently, however, to allow the fruit to escape were it not for the guide 19 which is concentric to the larger sprockets 6 to prevent falling of the fruit to the ground. The bristles 13 push the fruit 20 up over the top of the guide 19, and onto the upper edge of an inclined plane 21 after which the fruit rolls down into the box 18. To prevent crushing the fruit the bristles are made from steel wire of high elasticity which enables them to slip around and move a prune without bruising it and put it in place for following bristles to drive it into the mesh. The pliant bristles pass over rocks or clods, or slip round them if too heavy to be moved; but preferably the ground is pulverized or rolled smooth before the fruit is shaken from the trees.

Dirt and leaves are left behind or sifted out between the parallel feet of the bristles as the fruit is carried up from the ground, but the bristles are too close together to permit the fruit to escape. A hand propelled picker is shown, but it is obvious that power could be applied and that many other modifications of design could be made without departing from the spirit of my invention.

I claim:

1. A fruit picker of the type including a frame rollable over a surface, comprising a pair of forward pulleys on said frame, a pair of intermediate pulleys on said frame with their lower peripheral extremity disposed at a substantially higher level than that of the forward pulleys, an endless belt trained around said pulleys, a plurality of transverse slats on said belt so as to follow each other in close succession, a row of bristles on each of said slats spaced from each other a distance less than the normal size of the fruit to be picked up, the bristles on adjacent slats being staggered relative to each other, and a rearwardly extending foot portion on the tip of each bristle adapted to almost touch the tip of a succeeding aligned bristle when said bristles are in parallelism and to spread sufficiently to admit a fruit therebetween when the bristles are radially disposed with respect to the sprockets.

2. Apparatus for picking up fruit from the ground comprising a wheeled vehicle having a pair of pulleys on its forward end adapted to lie in proximity to ground at their lower peripheral edges and a pair of pulleys mounted on said vehicle to the rear of said forward pulleys and at an elevation to dispose their lower peripheries above those of the forward pulleys, an endless belt trained around said pulleys, a plurality of slats on said belt following each other in close succession, a row of bristles on each slat, the bristles being spaced slightly less than the size of the fruit and staggered on adjacent slats but aligned on alternate slats, and a foot portion on the tip of each bristle adapted to almost touch the tip of a succeeding aligned bristle when the bristles are in parallelism for holding fruit between the bristles and to open up relative to the tip of succeeding bristles when they are traveling around the pulleys for allowing the fruit to enter between, or exit from the bristles of adjacent slats.

3. A fruit picker of the wheeled type adapted to travel over the surface of the earth and including a frame having a forward and a rearward pulley spaced from each other and supporting an endless belt drivingly associated with the wheels of said picker; the combination therewith of a plurality of transverse slats each carrying a plurality of bristles in spaced relation with respect to each other, and a foot portion for each said bristle adapted to lie in a common plane with the foot portions of other bristles and contiguous to the foot portion of an aligned bristle whereby to provide a screen when said bristles are in parallelism for supporting fruit therebetween, said bristles being radially disposed when traveling around said forward pulley so as to allow fruit to enter between the bristles, and for closing the bristles into parallelism in snap-like action for brushing the fruit therebetween into the screen provided by the feet of the parallel bristles for conveyance toward the rearmost pulley, said rearward pulley causing the bristles to separate for releasing the fruit between them, and a receptacle for receiving the fruit released from between the bristles.

4. In an apparatus for gathering fallen fruit or the like from the ground of the wheeled vehicle type having an endless belt adapted to travel rearwardly and upwardly at its lower reach, the combination therewith of a plurality of transverse rows of tines with each tine and each row thereof spaced from each other sufficient to confine a fruit therebetween, the tines on successive rows being offset relative to each other and aligned with the tines of alternate rows thereof, said tines opening up in radial array adjacent the surface of the ground for admitting fruit between them, and a foot portion on each tine adapted to nearly abut with the foot portion of adjacent aligned tines in parallelism with each other for forming a fruit retaining screen at the extremities of the tines in the lower inclined reach of said belt.

5. In an apparatus for gathering fallen fruit or the like from the ground of the wheeled vehicle type having an endless belt adapted to travel rearwardly and upwardly at its lower reach, the combination therewith of a plurality of transverse rows of tines with each tine and each row thereof spaced from each other sufficient to confine a fruit therebetween, the tines on successive rows being offset relative to each other and aligned with the tines of alternate rows thereof, said tines opening up in radial array adjacent the surface of the ground for admitting fruit between them, a foot portion on each tine adapted to nearly abut with the foot portion of adjacent aligned tines in parallelism with each other for forming a fruit retaining screen at the extremities of the tines in the lower inclined reach of said belt, and a guide formed concentric to the upper curved end of said endless belt for supporting fruit as the tines separate at the upper end of said lower inclined reach of said belt, said guide terminating in a discharge ledge adapted to align with a radially disposed tine when it is downwardly inclined for discharging gathered fruit from the discharge ledge of said guide.

6. In an apparatus for gathering fallen fruit or the like from the ground of the wheeled vehicle type having an endless belt adapted to travel rearwardly and upwardly at its lower reach, the combination therewith of a plurality of transverse rows of tines with each tine and each row thereof spaced from each other sufficient to confine a fruit therebetween, the tines on successive rows being offset relative to each other and aligned with the tines of alternate rows thereof, said tines opening up in radial array adjacent the surface of the ground for admitting fruit between them, a foot portion on each tine adapted to nearly abut with the foot portion of adjacent aligned tines in parallelism with each other for forming a fruit retaining screen at the extremities of the tines in the lower inclined reach of said belt, a guide formed concentric to the upper curved end of said endless belt for supporting fruit as the tines separate at the upper end of said lower inclined reach of said belt, said guide terminating in a discharge ledge adapted to align with a radially disposed tine when it is downwardly inclined for discharging gathered fruit from the discharge ledge of said guide, a receptacle on said vehicle, and an inclined chute extending from the discharge ledge of said guide into said receptacle.

JOE M. TRAVERSO.

REFERENCES CITED

The following references are of record in the file of this patent:

UNITED STATES PATENTS

| Number | Name | Date |
| --- | --- | --- |
| 1,104,431 | Lint | July 21, 1914 |
| 1,316,355 | Collis | Sept. 16, 1919 |
| 1,378,275 | Rademacher | May 17, 1921 |
| 1,439,266 | Shaw | Dec. 19, 1922 |